(12) United States Patent
Stolz

(10) Patent No.: US 7,410,157 B2
(45) Date of Patent: Aug. 12, 2008

(54) DEVICE FOR CONVEYING BOOK BLOCKS ON A CONVEYING LINE OF A MACHINE FOR PRODUCING BOOKS, MAGAZINES, OR THE LIKE

(75) Inventor: Thomas Stolz, Hagenbuch (CH)

(73) Assignee: Muller Martini Holding AG, Hergiswil (CH)

( * ) Notice: Subject to any disclaimer, the term of this patent is extended or adjusted under 35 U.S.C. 154(b) by 108 days.

(21) Appl. No.: 11/077,094

(22) Filed: Mar. 10, 2005

(65) Prior Publication Data

US 2005/0201849 A1  Sep. 15, 2005

(30) Foreign Application Priority Data

Mar. 11, 2004  (EP)  ............................ 04405141

(51) Int. Cl.
*B65H 39/00* (2006.01)
(52) U.S. Cl. ............... 270/52.14; 270/52.16; 270/52.18
(58) Field of Classification Search ............. 270/52.14, 270/52.16, 52.18; 271/271; 198/644, 836.3, 198/728, 735.1; 412/9, 33, 37; 227/39, 99, 227/135

See application file for complete search history.

(56) References Cited

U.S. PATENT DOCUMENTS

| 2,895,148 | A |   | 7/1959  | Hildmann |           |
|-----------|---|---|---------|----------|-----------|
| 3,418,947 | A |   | 12/1968 | Harrison |           |
| 3,503,489 | A |   | 3/1970  | Selis    |           |
| 4,549,729 | A | * | 10/1985 | Hoffstetter et al. | 270/39.07 |
| 5,080,217 | A | * | 1/1992  | Garlichs et al. | 198/735.3 |

FOREIGN PATENT DOCUMENTS

| DE | 31 16 679     |    | 1/1982  |
|----|---------------|----|---------|
| DE | 3840816 A1    | *  | 6/1990  |
| DE | 40 12 084     |    | 10/1991 |
| EP | 275521 A2     | *  | 7/1988  |
| EP | 1 232 879     |    | 8/2002  |
| GB | 682669        |    | 11/1952 |
| GB | 2 147 569     |    | 5/1985  |

* cited by examiner

*Primary Examiner*—Gene O. Crawford
*Assistant Examiner*—Leslie A Nicholson, III
(74) *Attorney, Agent, or Firm*—Friedrich Kueffner

(57) ABSTRACT

A conveyance device for the pressing of glued spines of a book block for books, in which the book blocks, with their spines directed downward, pass through a pressing section that reduces the spine swell. The book blocks, gripped between working pieces of revolving traction elements, pass through the pressing section, which acts on the sidepieces of the book spine.

11 Claims, 3 Drawing Sheets

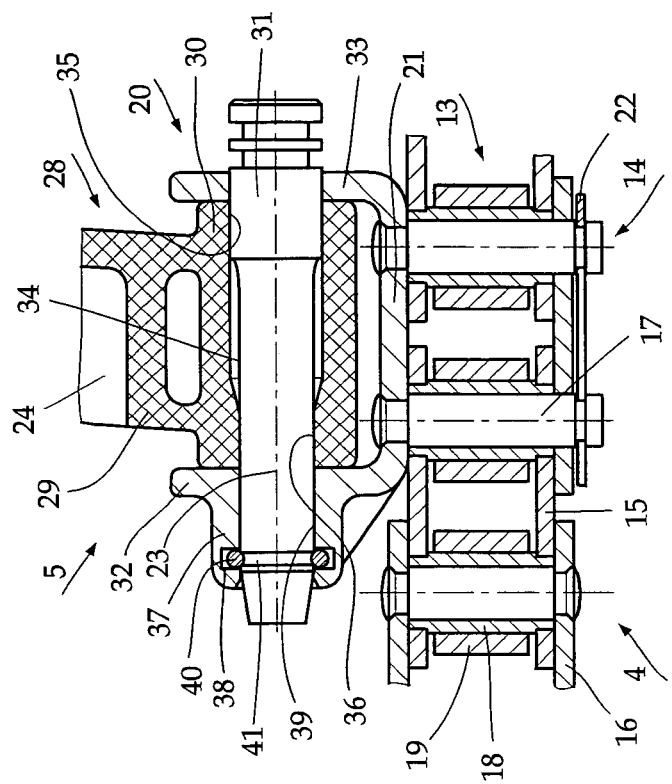
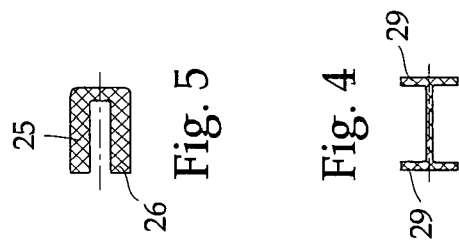
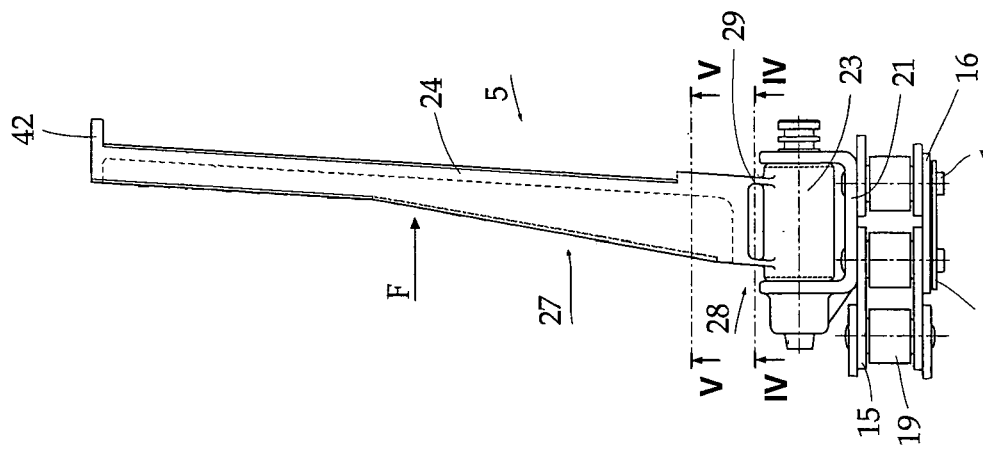

US 7,410,157 B2

DEVICE FOR CONVEYING BOOK BLOCKS ON A CONVEYING LINE OF A MACHINE FOR PRODUCING BOOKS, MAGAZINES, OR THE LIKE

BACKGROUND OF THE INVENTION

1. Field of the Invention

The present invention relates to a device for conveying book blocks on a conveying line of a machine for producing books, magazines, or the like, along which conveying line a revolving conveying element is installed, which conveys the book blocks and is designed with finger-like pushers that are mounted on a traction mechanism and project into a conveying channel transversely to the conveying direction.

2. Description of the Related Art

Devices of the aforementioned type are known, for example, in installations for producing perfect-bound book blocks or books and in back-gluing machines, especially for thread-stitched book blocks.

In gathering machines, to form loose book blocks by feeders arranged along a conveying line, a conveying channel is loaded with printed products, and the book blocks, which are formed from stacked printed products are fed, standing on the spine of the book block, to a perfect binder. On the conveyance path, the loose book blocks are set up vertically, so that they can be inserted from below into the revolving conveyor clamps of a perfect binder. For this purpose, the gathering machine has pushers, which are mounted on a traction mechanism and project into a conveying channel and, during the formation of the loose book blocks, convey the latter by pushing against the so-called head or foot edge of the book block. During this process, the book block is turned about 90° in a vertical plane transverse to the direction of conveyance by a setting up element, so that it arrives at the perfect binder standing on its spine. In this conveyor section, the book block passes the setting up element, which is winding more or less helically in the conveying direction, where the book block is set on its spine, and the pusher is successively shifted into a horizontal position by a guide slot.

Both during the gathering of the printed products and during the transfer from the gathering machine to the perfect binder, it happens that printed products collide on the conveying tract and are displaced relative to the conveying direction, so that a backup then develops, which can cause the pusher, which is made of plastic, to break. Furthermore, in addition to the breaking of the pusher finger, the hinge, the holder, and/or chain links of the traction mechanism are damaged and thus must be replaced. This results in increased repair expense, especially since there are only "a few" places along the conveying line at which there is enough room to be able to repair the damage.

If the damage involves the chain, the tension on it must be released to replace the links. Accessibility to the chain with tools is limited in most cases, and it is no simple matter for the repairman to do his job properly in tight spaces with screws, nuts, bolts, and lock rings.

SUMMARY OF THE INVENTION

Therefore, it is the primary object of the invention is to construct the pushers and their mounting parts in such a way that disassembly or exchange of parts can be carried out simply without strain on the traction mechanism and without spending a great deal of time.

In accordance with the invention, this object is achieved in such a way that the finger-like pusher has a predetermined breaking zone located some distance from the mounting point; so that when the pusher breaks, no other parts of the conveying element are damaged.

BRIEF DESCRIPTION OF THE DRAWING

In the drawing:

FIG. 3 shows a partial top view of a conveying element, which comprises a traction mechanism and a pusher mounted on it.

FIG. 4 shows a cross section along line IV-IV in FIG. 3 through a predetermined breaking zone of the pusher.

FIG. 5 shows a cross section along line V-V in FIG. 3 through the pusher.

FIG. 6 shows a partial longitudinal section in the conveying direction through the conveying element.

DETAILED DESCRIPTION OF THE INVENTION

Figure 1:
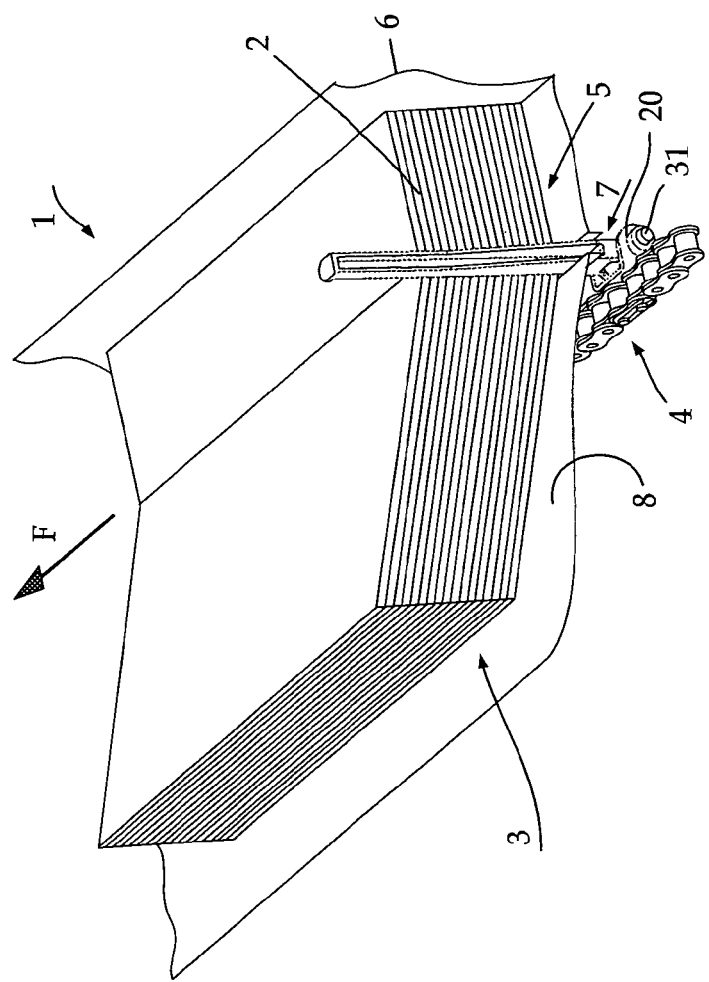
FIG. 1 shows a partial three-dimensional representation of a conveying channel of a gathering machine.
Figure 7:
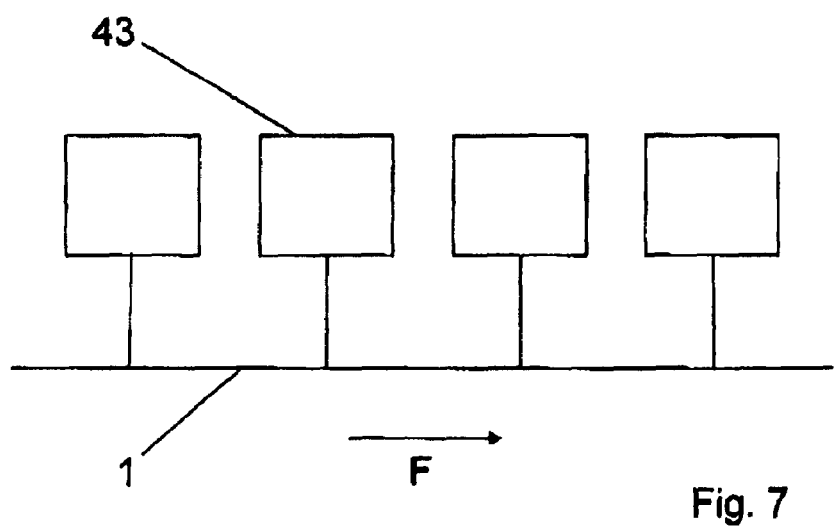
FIG. 7 schematically shows feeders used in the device according to the invention.

FIG. 1 shows a section of a conveying channel 1 of a gathering machine, in which a loose book block 3 consisting of gathered signatures 2 is located. The book block 3 is conveyed at its back end (relative to the conveying direction F) by a pusher 5 mounted on a driven conveying chain that is used as the traction mechanism 4. The conveying channel 1 has a guide wall 6, which the signatures 2 strike fold first as they are fed individually from the opposite side by signature feeders 43. The pushers 5, which are mounted at regular intervals on the revolving conveying chain, run in a slot 7 in the base 8 of the channel and serve to convey the forming book block 3.

Figure 2:
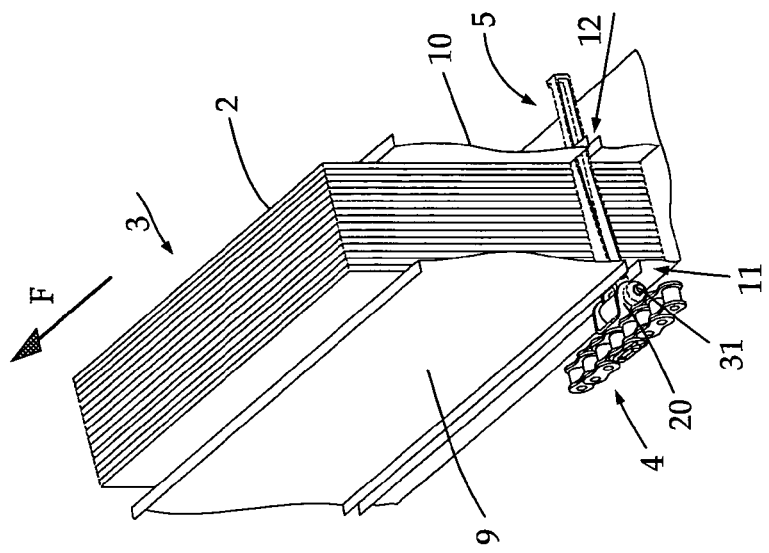
FIG. 2 shows a partial three-dimensional representation of the conveying channel after a setting up element.

At the end of the gathering line, the conveying channel 1 turns about 90° in the conveying direction, so that the book block 3 is standing on the folded spines of the signatures 2 and is further conveyed by the pusher 5, which has also turned 90°. FIG. 2 illustrates the book block standing on its spine, which is formed by the edges of the signatures 2. The pusher 5 passes through two lateral guide walls 9, 10 that form the conveying channel 1. The guide walls are provided with slot-like recesses 11, 12.

FIG. 3 shows the pusher 5 in the position illustrated in FIG. 2, in which a multilink, simple roller chain is provided as the traction mechanism 4. The roller chain consists of inside links 13 and outside links 14, whose plates 15, 16 are securely connected by bolts 17 and sleeves 18. Freely rotating, hollow rollers 19 are supported on the sleeves 18.

At the mounting point of the pusher 5, for which an outside link 14 is used, an outside plate 16 is replaced by a bearing block 20, which serves as the mounting for the pusher 5. For this purpose, the bearing block 20 is provided with a mounting plate 21, in which two bolts 17 of the outside link 14 are riveted at one end with the mounting plate 21 of the bearing block 20 and are releasably secured at the other end by a spring shackle 22. The bearing block 20 designed as the mounting point for the pusher 5 has an axis of rotation 23 extending in the conveying direction F, on which the pusher 5 is rotatably supported, e.g., by a cam, in a plane standing transversely to the conveying direction F. In the present case, the slot 7 in the base 8 of the channel or the recesses 11, 12 of the guide walls 9, 10 form the cam by which the pusher 5 is supported. The pusher 5 is formed by a finger 24 that pushes against the rearward side of the book block 3 to convey it. The finger 24 has a U-shaped cross section adjacent to the predetermined breaking zone, and the sidepieces 25, 26 of the U-shaped cross section extend away from the conveying direction F. In the direction of the longitudinal extension of the pusher finger 24, the sidepieces 25, 26 have a diminishing cross section, at least in a section 27 after the predetermined breaking zone 28. In the predetermined breaking zone 28, the pusher finger 24 is connected by spaced connecting pieces 29 running transversely to the conveying direction F with a hub 30 of the pusher 5 (See FIG. 4).

The hub 30 is arranged on the axis of rotation 23. The pusher 5 is connected by the hub 30 with the bearing block 20, which is mounted on the traction mechanism or roller chain 4. The pusher 5 is connected with the bearing block 20 by a socket pin 31, which passes through two bearing webs 32, 33 of the bearing block 20, which are spaced apart in the conveying direction F, and through the hub 30 of the pusher 5, which (hub 30) is arranged between them (eee especially FIG. 6).

The socket pin 31 forms the axis of rotation 23. The socket pin 31 is designed in such a way that, on the one hand, it can be passed through only from one end of the bearing block and, on the other hand, can be passed through both parts only at one end of the hub 30. This makes it possible for the pusher 5 to be placed in the correct operating position during a change, and for the socket pin 31 to be secured on the bearing web 32 provided for this purpose. To this end, the hub 30 of the pusher 5 has a bore 34, which has a larger diameter at the insertion end 35 of the socket pin 31 than at the exit end 36. Accordingly, the insertion hole of the bearing web 33 is larger than the exit hole of the bearing block 20 at its opposite end.

To secure the socket pin 31, a lug 37 is mounted on the bearing web on the exit side. It forms part of a locking mechanism 41 for preventing the socket pin from moving out of the operating position in the direction of the axis of rotation 23. The other essential parts of the locking mechanism 41 are a circular groove 38 in a bore 39 of the lug 37 and a snap ring 40 inserted in the groove 38, which snap ring (40) catches in an annular groove 41 in the socket pin 31. So that the socket pin 31 can be easily inserted in the different bore diameters, its front end is shaped like a conical frustum. The pusher 5 is preferably an injection-molded plastic part, which has a projection 42 at its free end for reinforcement.

The invention is not limited by the embodiments described above which are presented as examples only but can be modified in various ways within the scope of the protection defined by the appended patent claims.

I claim:

1. A device for conveying book blocks on a conveying line of a machine for producing books, magazines, or the like, the device comprising:

a revolving conveying element installed along the conveying line for conveying the book blocks in a conveying direction;
a traction mechanism;
finger-like pushers mounted on the traction mechanism and projecting into a conveying channel transversely to the conveying direction, wherein the finger-like pusher has a predetermined breaking zone located at a distance from a mounting point of the pusher to the traction mechanism, wherein the pusher is rotatable, and the mounting point is formed by an axis of rotation of the pusher, wherein the pusher finger has a U-shaped cross section adjacent to the predetermined breaking zone, wherein the pusher has a hub and, in the predetermined breaking zone, the pusher finger is connected by connecting pieces spaced from one another and running transversely to the conveying direction with the hub of the pusher, which hub is arranged on the axis of rotation.

2. The device in accordance with claim 1 for forming loose book blocks by gathering printed products on a conveying line, along which a conveying channel with feeders that feed the printed products and the conveying element that conveys the book blocks are arranged.

3. The device in accordance with claim 1, wherein the sidepieces of the U-shaped cross section extend away from the conveying direction.

4. The device in accordance with claim 1, wherein the pusher finger has side pieces which have a diminishing cross section in the direction of the longitudinal extension of the pusher finger.

5. The device in accordance with claim 1, wherein the pusher is mounted by the hub on a bearing block connected with the traction mechanism.

6. The device in accordance with claim 5, with a traction mechanism constructed as a roller chain, wherein the bearing block is mounted on the roller chain by a mounting plate designed as an outside plate of a chain link.

7. The device in accordance with claim 6, wherein the mounting plate forms part of a shackle-type chain connector.

8. The device in accordance with claim 5, wherein the bearing block has two bearing webs that are spaced apart and directed transversely to the conveying direction, between which bearing webs the hub (30) of a pusher is supported on a socket pin that extends through the bearing webs.

9. The device in accordance with claim 8, wherein the front end of the socket pin has a smaller diameter than the rear end of the socket pin.

10. The device in accordance with claim 8, wherein different bores in the hub of the pusher are assigned to the ends of the socket pin and to the bearing webs of the bearing block.

11. The device in accordance with claim 8, wherein to provide axial locking of the socket pin, a locking mechanism is provided between the socket pin and the bearing block.

* * * * *